Oct. 18, 1932. H. E. CHIPMAN ET AL 1,883,562
SOUND FILM AND METHOD OF MAKING SAME
Filed Nov. 5, 1928
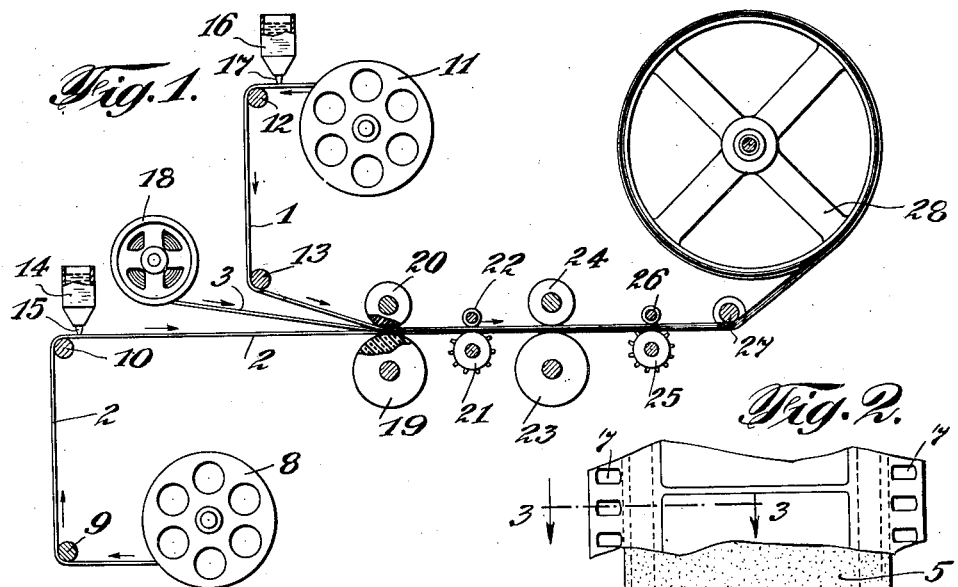
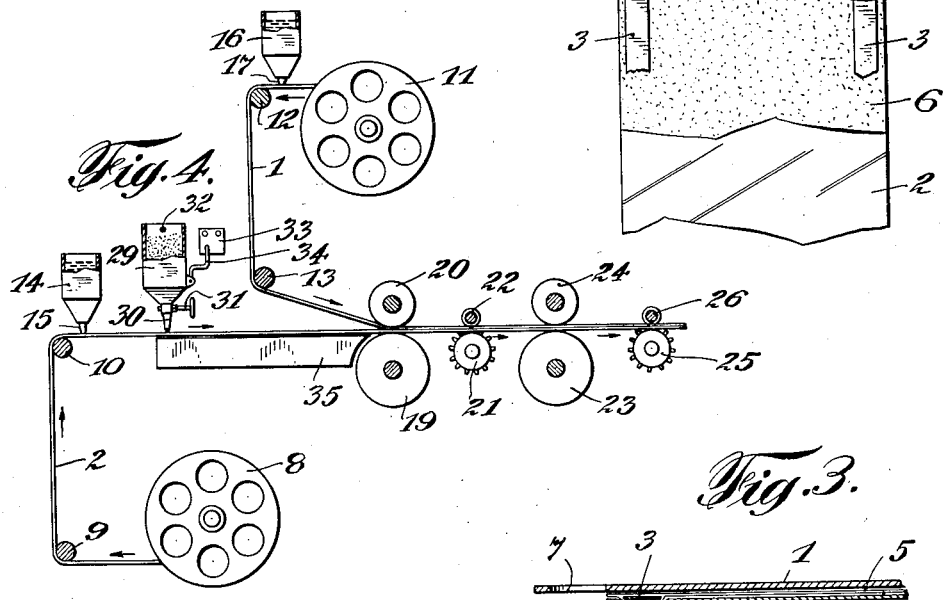
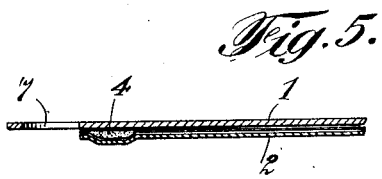
INVENTOR
Harry E. Chipman
and Howard H. Chipman
BY
Henry Van Arsdale
their ATTORNEY Patented Oct. 18, 1932

1,883,562

UNITED STATES PATENT OFFICE

HARRY E. CHIPMAN, OF SPRINGFIELD, MASSACHUSETTS, AND HOWARD H. CHIPMAN, OF NEW YORK, N. Y., ASSIGNORS, BY DIRECT AND MESNE ASSIGNMENTS, TO ANDREW LE ROY CHIPMAN, OF NEW YORK, N. Y.

SOUND FILM AND METHOD OF MAKING SAME

Application filed November 5, 1928. Serial No. 317,290.

This invention relates generally to sound film and more particularly to motion picture film having one or more strips of magnetic sound recording material imbedded within the film body or between the film layers. This invention is also concerned with a method and apparatus for effectively producing our sound film cheaply and in quantities.

An object of this invention is to provide a sound film having the sound record permanently incorporated with the picture film so as to constitute a unitary structure.

Another object of this invention is to provide a sound film comprising a sound record of magnetic properties and a picture film combined into a unitary structure in such a manner that the recording and reproducing characteristics of the sound record and the photographic properties of the picture film are in no way impaired.

Another object of this invention is to incorporate a magnetic sound record with a picture film in such a manner that the sound record will not unloosen or become detached from the picture film due to temperature or moisture changes or long continued hard usage.

Still another object of this invention is to devise a method of securing a sound record to a film body permanently and securely and means which will enable the manufacturer to make the sound film according to our method rapidly and at low cost.

Other objects of our invention will be in part obvious and in part pointed out as the disclosure proceeds.

Our sound film comprises a film body composed of film layers having the sound record of magnetic material embedded between the layers. Two film layers are preferably used, both of photo-transparency, but only one need carry the photographic emulsion. Our magnetic sound record is laid between the film layers in one or more strips extending lengthwise of the film, and may be permanently cemented to the top and bottom film layers. The film layers may also be cemented together for their entire widths to form an integral film body. Some photo-transparent cement is preferably used and may comprise material of substantially the same composition as the film layers.

The cementitious material is brushed on the adjacent surfaces of both film layers. Our sound record comprises a strip or strips of either granular magnetic material or magnetic ribbon positioned lengthwise of the film layers and embedded therebetween after the cementitious material has been applied. The film layers are then pressed together by means of suitable rollers and dried on a large dryer which keeps the film flat and prevents buckling thereof.

In order that a clearer understanding of our invention may be had, attention is hereby directed to the accompanying drawing, forming a part of this application and illustrating certain possible embodiments of this invention.

Referring to the drawing Fig. 1 illustrates one form of apparatus for making our sound film;

Fig. 2 is a face view of our sound film with certain fragments broken away to show more clearly the structure thereof;

Fig. 3 is an enlarged fragmentary cross sectional view of our sound film taken on lines 3—3 of Fig. 2;

Fig. 4 illustrates a modified form of apparatus for making sound film, more particularly sound film in which the sound record comprises granular material;

Fig. 5 is a fragmentary cross sectional view of a modified form of sound film, similar to the sound film shown in Figs. 2 and 3 except that the sound record embedded between the film layers comprises granular material.

Similar reference characters refer to similar parts throughout the several views of the drawing.

Referring more particularly to Figs. 2 and 3, our sound film comprises a film body having one or more strips of magnetic sound recording material permanently incorporated therewith. The film body comprises two film layers, a top film layer 1 and a bottom film layer 2 cemented together. It is necessary that both film layers be composed of photo-transparent material so as to permit the necessary photographic light rays to pass through the film body. Only one film layer such as the top layer, as shown in Fig. 2, need carry the photographic emulsion coating. The thickness of the top and bottom layers can be limited so that their combined thickness is not appreciably greater than the thickness of film generally in use. The emulsified film layer 1, for example, can be limited to a thickness of three thousandths of an inch, and the non-emulsified film layer 2 need not exceed in thickness two thousandths of an inch. As shown in Figs. 2, 3 and 5 the bottom film layer need not be as wide as the top film layer, but only wide enough to fully cover the sound strips embedded therebetween.

Our sound record is permanently embedded or pocketed between the top and bottom film layers. The sound record may comprise a strip or ribbon of some magnetic metal 3 as shown in Figs. 2 and 3 or it may comprise magnetic granules or particles 4 laid in a strip between the film layers, as shown in Fig. 5. In either case one or both of the adjacent surfaces of the respective film layers may be coated with some cementitious material. We preferably apply a cement coating 5 to the underside of the top film layer 1 and a cement coating 6 to the top side of the bottom layer, both coatings extending the full width of the respective film layers. By coating both film layers with cementitious material, it is seen that the sound strips 3 or 4 are completely surrounded and embedded therein, firmly binding the sound strips to both the top and bottom film layers. The film layers are then firmly pressed together so as to cause the sound strips to embed themselves in the cementitious material and to cause all portions of the film layers to firmly adhere one to another.

We preferably incorporate two sound strips of magnetizable material to each strip of film, as shown in Fig. 2, a sound strip being positioned at each side of the film, between the sprocket holes 7 and the picture area. However, only one sound strip may be used and the sound strip or strips may be secured in various positions on the film where they will not interfere with the taking of the picture within the contemplation of this invention.

The cementitious material is preferably applied in a fluid or semi-fluid condition and should be of such a character as to harden and solidify into a strong and tough material upon cooling or drying. It is necessary that the cementitious material be strong, to firmly bind the film layers together, and tough, so that cracks will not form in the same. This cementitious material may be composed of practically the same ingredients as that of the film body, and may be applied to the film layers 1 and 2 in a semi-fluid condition. When solidified these cementitious layers will assume the characteristics of the film body, possessing the same appearance, hardness, toughness, bending and expansion characteristics.

We have discovered that magnetic lines of force, when suitable coils are used and the proper voltage is applied will travel through film layers and cementitious material in general without hindrance or interruption. The magnetic material pocketed between the film layers can readily be magnetized to produce the desired sound record by passing the sound strip under the magnetizing pole piece of the recording head, described in the prior patent of Harry E. Chipman, No. 1,612,359 patented December 28, 1926. Reproduction of the sound recorded in the magnetic material is not interfered with by the surrounding film layers.

We have shown in Fig. 1 an apparatus for making our sound film. The bottom film layer 2 is fed from reel 8 over the guide rollers 9 and 10. The top film layer 1 is fed from an upper reel 11 over the guide rollers 12 and 13. A cement pot 14, containing the cementitious substance, is suitably supported over the lower film strip and is provided with a suitable nozzle or dispenser 15, extending substantially the full width of the film, for placing the cementitious coating 6 on the advancing film. Another cement pot 16 containing the cementitious substance is suitably supported over the advancing top film layer. Cement pot 16 is provided with a suitable dispenser 17 extending substantially the full width of the film and so positioned as to place the cementitious coating 5 on the lower surface of the film layer.

When a sound record consisting of a magnetic wire or ribbon 3 is used, the sound ribbon is carried on a spool or reel 18 and fed therefrom to its proper location between the film layers. It is understood that the film reels 8 and 11 are so positioned as to permit the laying of the top film layer 1 upon the bottom film layer 2. Sound ribbon reel 18 is likewise so positioned as to feed the sound ribbon to its proper position between the film layers. If more than one strip of sound ribbon is to be embedded between the film layers, a corresponding number of sound ribbon reels, properly positioned are provided.

The top and bottom film layers having their adjacent sides properly cemented and the sound ribbon or ribbons properly positioned therebetween, are now run between cooperating pressure rollers 19 and 20. The film contacting surfaces of rollers 19 and 20 are preferably made of resilient material such as soft rubber, so as to accommodate any bulge in the film due to the sound ribbon embedded therebetween. Pressure rollers 19 and 20 cooperate to press the top and bottom film layers firmly together, causing all adjacent areas to strongly adhere, one to the other.

The sound strip is by this pressing operation, immovably embedded in the cementitious material and caused to firmly adhere to the film layers. Should a strip of granular magnetic material be used as the sound record, cooperating rollers 19 and 20 serve the additional purpose of compacting the granules well together, which is necessary to produce the most effective sound recordation and reproduction with this type of sound strip. To draw the film layer and sound wire from their respective reels and through the cooperating pressure rollers 19 and 20, a sprocket wheel 21 and cooperating pressure roller 22 are provided. Suitable motivating mechanism is operably connected to the sprocket wheel to drive the same.

Another set of cooperating pressure rollers 23 and 24 may be provided, spaced from the first set of rollers 19 and 20. These rollers additionally compact the film layers together, making sure that they are properly cemented together and the sound strip securely cemented to both layers. The sprocket wheel 25 and its cooperating pressure roller 26 operate to draw the film through the cooperating pressure rollers 23 and 24 so that the film layers and sound wire are steadily advanced and the film manufacturing process becomes continuous.

The film is then wound up upon a large drying drum 28 where it is exposed to the drying action of the air. This drying operation cannot be forced, as forced drying would cause the film to buckle and curl. The film is placed on the drying drum in a flat condition and so held while the drying takes place. The drum is given a slow translatory movement as it rotates, causing the film to spirally wind thereon in such a manner that the film strip will not overlap one another. The construction and operation of the drum is described in the co-pending application of Harry E. Chipman, Serial No. 698,588 filed March 12, 1924.

In making a sound film wherein the sound element embedded between the film layers consist of granular magnetic material, as shown in Fig. 5, a granular distributing device is substituted for each sound ribbon reel 1 shown in Fig. 1. Our distributing device comprises generally a receptacle 29 which contains the magnetic particles or steel fillings. As many of these receptacles are provided as there are sound strips to be laid. Each receptacle is provided with a feed spout 30 which conducts the magnetic particles in an even strip over the cement coating 6. The feed spout may be provided with a suitable valve 31 by means of which the flow of magnetic material to the film may be controlled. Each container or receptacle may also be equipped with a suitable vibrator or other mechanism for insuring a steady flow of the magnetic particles on to the film layer. For this purpose we suspend the container 29 from a rod 32 or other suitable means. An electric vibrator represented at 33 is provided having a vibrator arm 34, pivotally secured to the container. It is seen that by this apparatus the container may be rocked or vibrated rapidly to and fro through a small angle, causing the magnetic particles to flow in a steady and uniform stream to the film.

In order that the magnetic particles be concentrated into a uniform strip and held in position prior to covering the same with the top film layer 1, a suitable magnet 35 may be provided, positioned under the film and extending from each feed spout 30 to the lower pressure roller 19. Magnets 35 aid in obtaining a uniform flow of magnetic particles from the receptacles 29 to the lower film layer, concentrate the particles into uniform and compact strips and further retain the particles against movement until they have been covered and fixed in position by the overlying film layer.

If necessary the glue pots 14 and 16 may be heated so as to maintain uniform flow of the cementitious material on to the respective film layers. To expedite manufacture, reels 8, 18 and 26 may be of such size as to carry a wide sheet of film layers. The various glue pots, dryers, sound wire reels or granular sound material distributors may then be duplicated or enlarged so as to lay a number of sound strips, properly spaced on the film sheet. The sheet is then properly cut into film strips of proper width and the sprocket holes made therein.

Thus it is seen that we have produced a sound film comprising film layers with magnetic sound material embedded therebetween and firmly secured to a film to form a unitary whole. If sound ribbon 3 such as shown in Fig. 2 is used, it is preferable that a ribbon strip be disposed on each side of the film, so that the film, in expanding or contracting will not warp. A pair of sound ribbons, one positioned along each side edge of the film and embedded between the film layers, prevents undue expansion or contraction of the film. The ribbon will not loosen from the film as it is embedded in the cementitious material, pocketed between and firmly bound to both film layers. When granular magnetic material is used as the sound record, as shown in Fig. 5, only one sound strip need be used on each film, as the granular strip readily expands and contracts with the film layers.

Our sound record is securely and immovably pocketed between the film layers and thus protected from injury or disturbance. With our sound film above described, the picture may be both taken and screened without hampering because of the attached sound record. Recordation and reproduction of any variety of sound can be attained with the greatest precision and accuracy, with the further assurance of proper synchronization with the actions and scenes impressed upon the film. By means of our method and apparatus of manufacture, our sound film can be produced cheaply, rapidly and in any desired quantity.

As many changes could be made in the above construction, and as many apparently widely different embodiments of this invention could be made without departing from the scope thereof, it is intended that all matter contained in the above description or shown in the accompanying drawing shall be interpreted as illustrative and not in a limiting sense.

What we claim is:—

1. A sound film of the character described, including in combination, a film body comprising a plurality of photo transparent layers, at least one of said layers carrying a photographic emulsion, and a line of magnetic material extending lengthwise of the film body and pocketed between said layers.

2. A sound film of the character described, including in combination, a film body comprising a pair of photo transparent layers, one of said layers carrying a photographic emulsion, and a pair of sound strips of magnetic material extending lengthwise of the film body, said strips being pocketed between and cemented to each of said layers.

This specification signed by said HARRY E. CHIPMAN this 23d day of October, 1928.

HARRY E. CHIPMAN.

This specification signed by said HOWARD H. CHIPMAN, this 23d day of October, 1928.

HOWARD H. CHIPMAN.